Sept. 27, 1966     F. DORÉ     3,274,672

METHOD OF MAKING A HEAT EXCHANGER

Filed June 4, 1963

INVENTOR.

Franklyn Doré

BY Wayne Lang

AGENT

United States Patent Office 3,274,672
Patented Sept. 27, 1966

3,274,672
METHOD OF MAKING A HEAT EXCHANGER
Franklyn Doré, Wellsville, N.Y., assignor, by mesne assignments, to The Air Preheater Company, Inc., a corporation of Delaware
Filed June 4, 1963, Ser. No. 285,357
2 Claims. (Cl. 29—157.3)

The present invention relates to improvements in plate type heat exchange apparatus utilized for the transmission of heat between two confined fluids and particularly to an improved construction arrangement for such heat exchange apparatus that is compact and strong, has excellent heat transfer characteristics, and is readily formed by a process of welding.

A typical plate type heat exchanger for the transfer of heat between two confined fluids generally comprises a plurality of spaced metallic plates forming passages through alternate ones of which a relatively hot gas flows in heat exchange relationship with air or other fluid to be heated that in turn transverses the intermediate passages. In many such heat exchangers a series of envelopes are provided wherein each comprises a pair of parallel plates spaced apart with spacing members therebetween utilized to close one pair of opposite sides of a passage for one of the fluids. The envelopes are mounted in spaced parallel relation to form therebetween other passages for a second fluid, the inter-envelope spaces also being closed along one pair of opposite side edges to limit the flow of fluid in a predetermined manner. A series of such spaced envelopes form a heat exchanger core that is enclosed in a housing having inlet and outlet manifolds leading to and away from the various passages through the heat exchanger.

It is customary for the space between metallic plates as well as the inter-envelope spaces to be closed by independent spacer bars which are usually brazed into their predetermined position to provide an integral structure therewith. The assembly procedure for such a structure is slow, and the resulting structure is non-flexible and heavy. Moreover a brazing procedure is essentially limited to large heat exchangers adapted for use at limited conditions of temperature, pressure and in a relatively non-corrosive atmosphere.

In the manufacture of small or compact heat exchangers for use at conditions of temperature, pressure and corrosion that preclude the use of brazed structure, none of the usual structural arrangements or manufacturing procedures are suitable and it therefore becomes the principal object of this invention to provide a method of manufacturing a heat exchanger suitable for use under the above listed conditions wherein the constituent parts are joined together by welding.

It is a further object of this invention to provide a compact heat exchanger assembly having a welding procedure adapted for automatic welding.

It is a still further object of this invention to provide a compact heat exchanger having welded joints that are adapted to be readily observed when disposed in an assembled relationship.

These and other objects of my invention will become more readily apparent when read in conjunction with the drawing in which.

Figure 2:
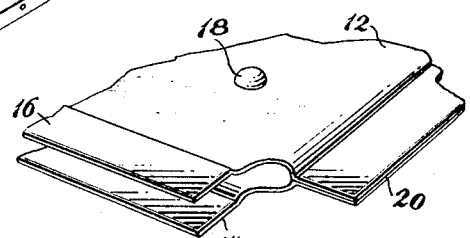
FIGURE 2 is an enlarged perspective view showing the construction features of a single envelope.
Figure 3:
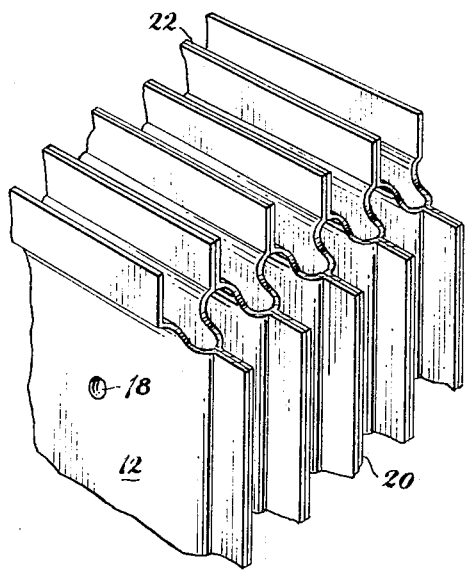
FIGURE 3 is a detailed view of the arrangement for assembling multiple envelopes into an integral assembly.

In the drawing a series of plates 12 are cut to a predetermined size and shape according to accepted design criteria. Corner sections of each plate are then similarly recessed at 14 to provide a flange 16 along each lateral edge of the plate 12. Each flange 16 is subsequently offset laterally from the principal plane of the plate 12, with the flanges along one pair of parallel edges of the plate being offset to the same side thereof, and the pair of parallel flanges 16 extending normal thereto being offset to the opposite side of plate 12 in the manner illustrated in FIGURES 2 or 3.

The distance each flange 16 is offset from the plane of plate 12 is determined by the design spacing between plates of a finished heat exchange envelope. For example, in a heat exchange envelope designed to have a spacing between its several plates of 0.060 inch, each flange would necessarily be offset 0.030 inch or one-half the designed plate spacing. Thus with a pair of plates disposed oppositely to permit one set of adjacent flanges 14 to extend into mutual contact while the other set would extend outward therefrom, the spacing between plates would amount to twice the height of each offset flange.

To insure a positive plate spacing at all times throughout the extent of each envelope, a series of dimples 18 may be formed in the surface of each plate. The dimples are formed at a single side of each plate whereby upon assembly, a single set of dimples will lie between each pair of adjacent plates. The dimples are therefore formed to a height identical with the design distance between plates and to the side of each plate determined by its final disposition within the heat exchanger assembly.

A pair of formed plates assembled in the foregoing manner are joined by welding together edges 20 of abutting flanges to provide an integral open ended envelope assembly. The open ends of each envelope assembly are bracketed on opposite sides by their outwardly extending flanges 16 so that when arranged to abut flanges of similarly formed envelopes, they provide an assembly having an inter-envelope spacing determined by the height of the offset flanges. The flanges of abutting envelopes are subsequently welded together along their edges 22 to combine a predetermined number of envelopes into an integral assembly of envelopes spaced apart to provide passageways therebetween lying intermediate the passageways which pass through the spaced envelopes.

Inasmuch as all welding is limited to the straight line welding of surfaces that are easily accessible, automatic welding procedures may be readily adapted to the entire welding process.

Since the recessed corners of each envelope assembly comprise essentially a series of plate members joined at their ends but centrally spaced from one another to form openings that permit leakage of fluid therethrough, an effective closure arrangement must be provided to block the openings and restrict the fluids to their respective passageways. For this purpose an elongate sealing bar 24 having an essentially triangular sectional configuration is formed to fit into each recessed corner section in order that it may be held in close contact therewith to close the spaces between plates and preclude fluid leakage.

To insure a positive sealing relationship between the sealing bar 24 and the adjacent edges of the envelope sheets in the recessed corners, one or more layers of sealing material 26 are preferably inserted therebetween. This sealing material may comprise any stable material which is relatively soft and more easily compressed than either the bar 24 or the edges of the sheets 12. In selecting the proper material attention should be given to the conditions of temperature, pressure and corrosion that obtain within the heat exchanger inasmuch as the sealing material will lie in direct contacting engagement with the several fluids being directed therethrough.

The envelope assembly is enclosed in a casing 32 having connecting flanges 35 on opposite sides thereof surrounding inlet and outlet openings for the heating fluid and the fluid to be heated. Special header sections as illustrated at 34 may be attached to the casing to enclose the openings for the several fluids to provide an improved distribution for the fluid as it flows through the passageways within the heat exchanger. Such header sections are not, however, mandatory and are illustrated here as a matter of information only.

Figure 4:
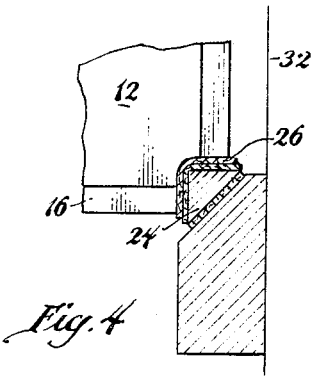
FIGURE 4 is a detailed representation of a corner packing arrangement including a filler bar.

The casing is formed as upper and lower complementary sections that when drawn together tightly embrace the sealing bars 24 at each corner of the envelope assembly and draw them into sealing contact with the recessed corners 14 of the assembled plate members in the manner illustrated by FIGURE 4. This arrangement permits a single bar 24 at each corner of the envelope assembly to close all inter-plate spaces to preclude leakage of fluid therethrough.

Figure 1:
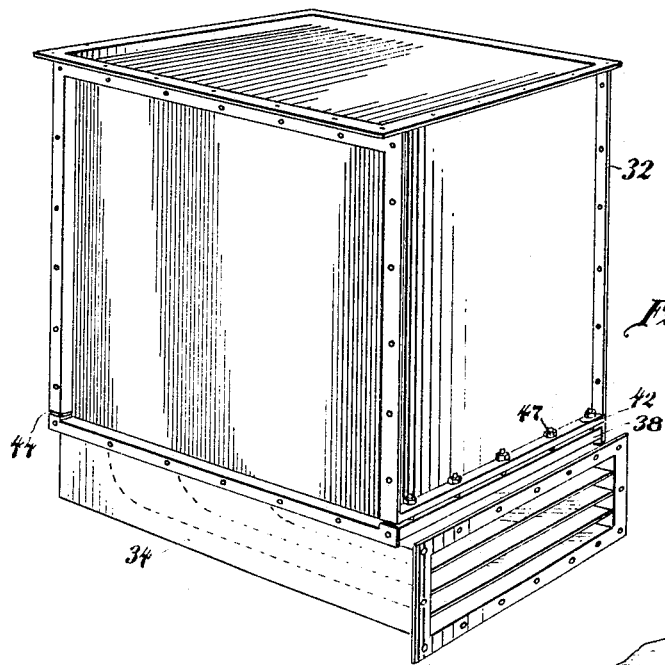
FIGURE 1 represents a perspective view of a plate type heat exchanger involving the invention.

In the arrangement of FIGURE 1 a series of laterally spaced studs on the flange 38 situated on the lower portion of the casing engage openings in flange 42 formed as part of the complementary portion of casing 32. A similar arrangement formed at 44 on the opposite side of the assembly permits the casing to be drawn tightly together about the envelope assembly and sealing bars by a systematic tightening of the nuts 47.

While the invention has been described with reference to the embodiment illustrated in the drawing, it is evident that various changes may be made without departing from the spirit of the invention. It is therefore intended that all matter contained in the foregoing description or shown in the accompanying drawings shall be interpreted as illustrative and not in a limiting sense.

I claim:

1. The method of forming a plate type heat exchanger which comprises the steps of forming a multiplicity of plain sided rectangular element sheets to include flanged edges between recessed corners, welding pairs of sheets together along one pair of parallel flanged edges to provide a series of open-ended envelopes, assembling the envelopes together with their plane sides in mutually adjacent relationship and their open ends similarly disposed at opposite sides of the assembly, welding the open ends of the envelope assemblies at their flanged edges to other flanged edges adjacent thereto to connect the envelopes into an integral assembly, forming sealing bars with a surface conforming to the recessed corners of the assembled envelopes, fitting the sealing bars to the recessed corners, inserting the envelope assembly including sealing bars into a casing, and drawing the casing tightly around said assembly to force a sealing relationship between the sealing bars and the confronting edges of the recessed corners.

2. The method of forming a plate type heat exchanger as defined in claim 1 including the step of placing a pliable packing intermediate the recessed corners and the surface of the associated sealing bar and forcing the sealing bar tightly into the aligned recessed corners of the envelope assembly to deform the pliable packing material and form an efficient sealing relationship therebetween.

References Cited by the Examiner

UNITED STATES PATENTS

| | | | |
|---|---|---|---|
| 1,635,838 | 7/1927 | Haber | 165—166 |
| 1,727,124 | 9/1929 | Lonsdale | 165—166 |
| 2,064,928 | 12/1936 | Lewis | 165—166 |
| 2,959,400 | 11/1960 | Simpelaar | 29—157.3 X |
| 2,959,401 | 11/1960 | Burton | 29—157.3 X |

FOREIGN PATENTS

| | | |
|---|---|---|
| 574,083 | 4/1933 | Germany. |
| 217,593 | 1926 | Great Britain. |
| 619,672 | 3/1949 | Great Britain. |

JOHN F. CAMPBELL, *Primary Examiner.*

J. D. HOBART, *Assistant Examiner.*